Oct. 31, 1939. W. O. SCHULTZ ET AL Re. 21,254

HOUSED TYPE OF REPEATING DROP-OUT FUSE

Original Filed March 29, 1935 2 Sheets-Sheet 1

INVENTORS
William O. Schultz
BY Alvin G. Steinmayer
Arthur R. Woolfolk
ATTORNEY.

Oct. 31, 1939. W. O. SCHULTZ ET AL Re. 21,254
HOUSED TYPE OF REPEATING DROP-OUT FUSE
Original Filed March 29, 1935 2 Sheets-Sheet 2
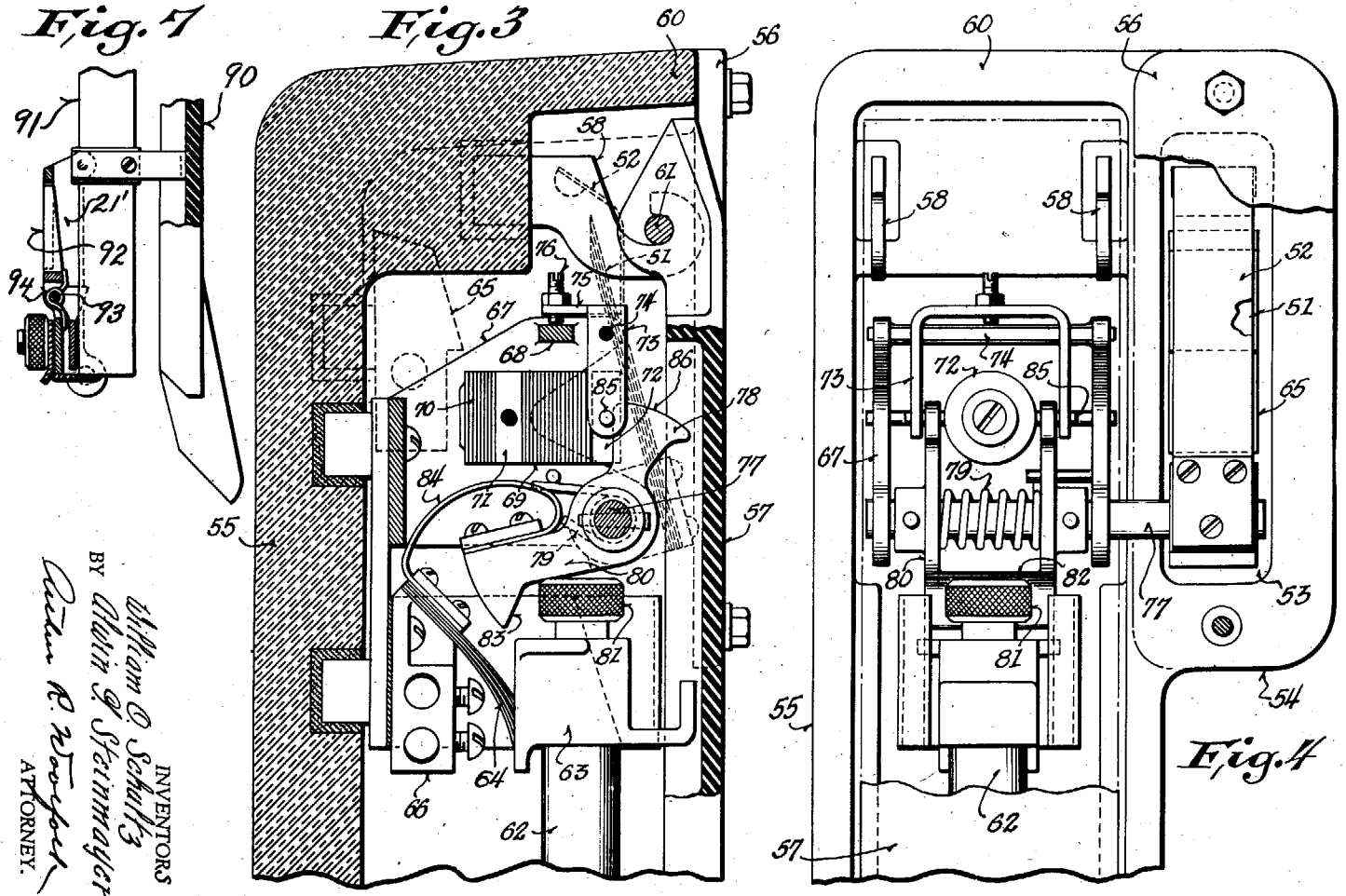
INVENTORS
William O. Schultz
BY Alwin G. Steinmayer
Arthur R. Woolfolk
ATTORNEY.

Reissued Oct. 31, 1939

Re. 21,254

UNITED STATES PATENT OFFICE 21,254

HOUSED TYPE OF REPEATING DROP-OUT FUSE

William O. Schultz, South Milwaukee, and Alwin G. Steinmayer, Milwaukee, Wis., assignors to Line Material Company, South Milwaukee, Wis., a corporation of Delaware Original No. 2,079,047, dated May 4, 1937, Serial No. 13,608, March 29, 1935. Application for reissue September 5, 1939, Serial No. 293,484

22 Claims. (Cl. 200—126)

This invention relates to a housed type of repeating drop-out fuse.

Objects of this invention are to provide a housed type of repeating drop-out fuse in which each unit has a casing which is provided with stationary contacts normally engaged by spaced contacts carried by the fuse tube, such, for example, as an expulsion fuse, in which the fuse tube and door are independently supported from the casing in such a manner that when the fuse blows, the door and fuse will rock outwardly away from the casing, the door being separately hinged from the fuse, in which the fuse will drop downwardly and the door will again close, the fuse projecting from the lower portion of the housing and the door swinging back towards closed position and thereby protecting the mechanism within the housing from the action of the weather, the projecting fuse tube giving a visual indication of the fact that the fuse has blown.

In general this invention is an improvement over that disclosed in our copending application Serial No. 715,668 filed March 15, 1934, now Patent #2,050,072, granted Aug. 14, 1936, for Housed type of drop-out fuse.

Further objects are to provide a housed type of repeating drop-out fuse in which each fuse unit has all of the contacts of the fuse tube, as well as the hinge support for the fuse tube, electrically dead when the fuse has rocked to its fully open position, thereby permitting free handling of the fuse tube for refusing, the fuse tube being freely rocked back into operative position after having been refused.

In greater detail, further objects of this invention are to provide a repeating fuse construction in which a plurality of housed type drop-out fuses are employed in which each preceding fuse is provided with automatic switching mechanism controlled by its fuse tube for establishing the circuit through the next adjacent fuse unit, the fuse tubes in each fuse unit being mechanically held in operative position, and, after blowing, dropping to inoperative position, the automatic mechanism connecting the next succeeding unit in the circuit.

Further objects are to provide a repeating fuse construction in which time delay mechanism is provided for the automatic switch so as to cause a predetermined delay between the blowing of one fuse and the closing of the circuit through the next succeeding unit, in which this time delay may be adjusted to any required value, in which means are provided for insuring the clearing of the fuse tube before it drops from operative to inoperative position, and in which means are provided arranged in the path of the fuse tube for opening the automatic switch when the fuse tube has been refused and rocked back to its operative position, thus reestablishing the circuit through the refused fuse without at any time interrupting the service.

Further objects are to provide a repeating fuse construction in which the automatic switch mechanism is removed from a position immediately adjacent the fuse of its particular fuse unit, in which adequate housing is provided for the automatic switch and automatic timing mechanism, and in which there is no danger of inadvertent flashover from any part of the automatic switch mechanism to an adjacent part of the fuse construction.

Embodiments of the invention are shown in the accompanying drawings, in which:

Figure 3 is an enlarged sectional view through the upper portion of a construction forming a further form of the invention.

Figure 4 is a front view with the cover broken away of the structure shown in Figure 3.

Figure 7 is a fragmentary view of the lower portion of the door and fuse tube, showing a modified form of the invention.

Figure 1:
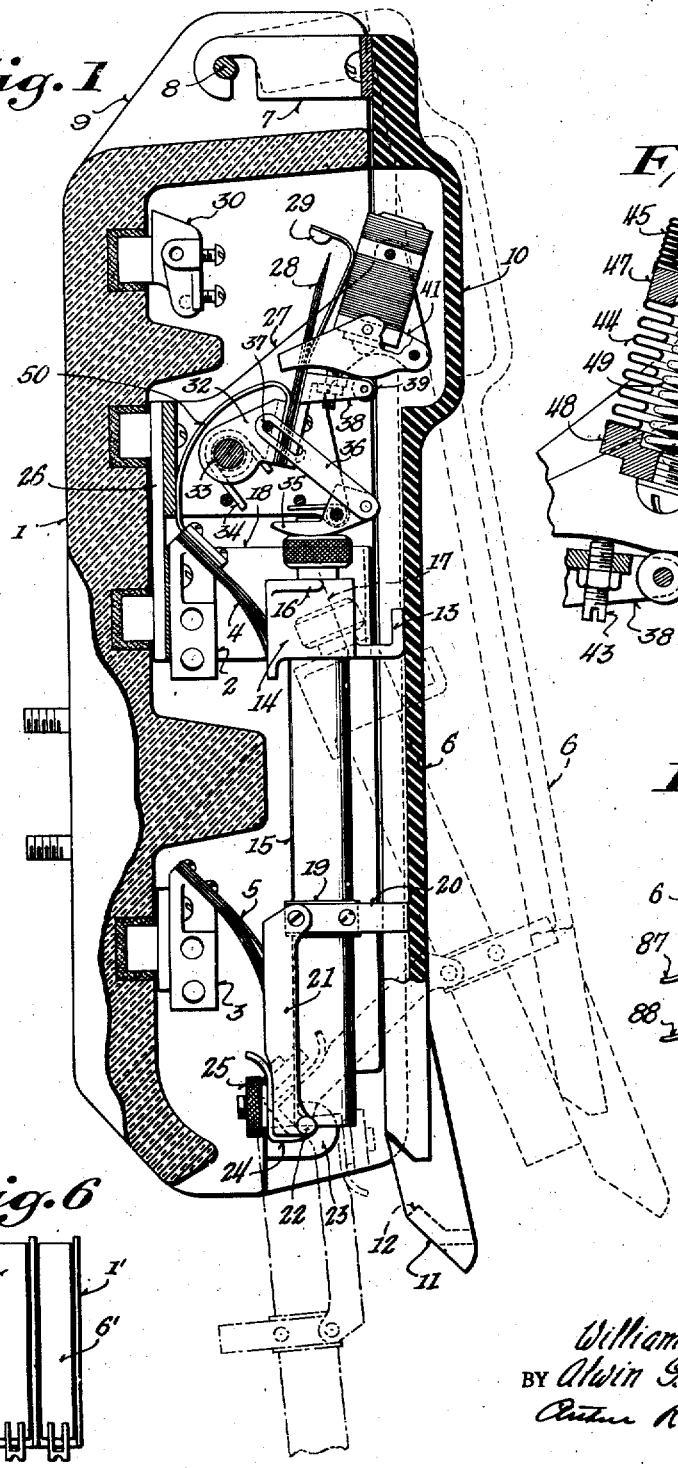
Figure 1 is a sectional view showing one form of the invention, parts being broken away and parts in section.
Figure 2:
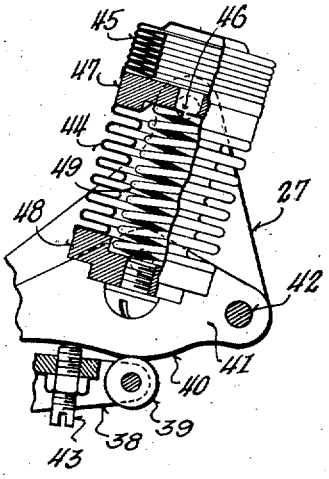
Figure 2 is an enlarged detail fragmentary view of the timing mechanism with parts broken away and in section.

Referring to Figures 1 and 2, it will be seen that the device comprises a housing or main body portion 1 which is provided with an upper terminal member 2 and a lower terminal member 3 provided with brush contacts 4 and 5, respectively. The housing is provided with a door 6 equipped with inwardly projecting hook like extensions 7 adjacent the upper end thereof which are hooked over a pin or pins 8 carried by ears 9 projecting upwardly from the housing. The door is preferably provided with an outwardly bulged portion 10 to accommodate parts of the timing mechanism hereinafter described.

The lower portion of the door may be provided with a projecting part 11 having a transverse web 12 adapted to hook into the projection or hook 13 of the upper contact 14 of the fuse tube 15 when it is desired to pull the fuse outwardly after the door has been removed, the door forming in effect an insulating manipulating member whereby the fuse may be pulled from closed to open position. This specific construction forms no portion of this invention and is described in greater detail in our above noted copending application.

The upper contact 14 normally engages the brush contact 4, such brush contact bearing against the rear face of the upper contact 14, as shown in Figure 1. This upper contact is provided with outwardly projecting ears 16 on opposite sides thereof which normally are positioned behind the slanting cam faces 17 on the spring arms 18 between which the upper contact is normally positioned, the spring arm 18 being supported from the upper terminal member. However, when the fuse is released, as will hereinafter appear, it rocks downwardly, the lower portion rocking outwardly as indicated in the upper dotted line position in Figure 1 and the ears 16 sliding downwardly and finally clearing the cam faces 17, after which the fuse rocks to full open position, as shown in the lower dotted line position in Figure 1, the door 6 merely swinging outwardly a slight extent to permit the passage of the fuse tube and thereafter swinging back to closed position.

The fuse tube is provided with a lower collar 19 which is provided with a looped forwardly projecting stop 20 slidably bearing on the inner surface of the door, it being noted also that the projection or hook like member 13 extending from the upper contact 14 of the fuse also bears loosely against the inner face of the door.

The collar 19 has hinged thereto the contact lever or supporting lever 21 which supports the fuse tube. This lever is provided with a pair of outwardly projecting trunnions 22 which removably fit within the hook-shaped hinge members 23. These hinge members are carried solely by the insulating housing 2 and are electrically dead after the fuse has swung to full open position.

The fuse link 24 projects through the open lower end of the expulsion fuse extending from the upper contact thereof in the usual manner and is clamped to the lever 21 by means of the thumb nut 25. The fuse link, therefore, restrains the lever from moving with reference to the fuse tube and consequently restrains the fuse tube from its opening movement. However, when the link is ruptured, the lever 21 is released and the lower end of the fuse tube first rocks outwardly, as indicated in the upper dotted line position, the fuse tube finally rocking to full open position, as indicated in the lower dotted line position. The door swings closed after the fuse tube has assumed its full open position.

The upper contact includes a plate 26 which electrically connects a pair of spaced arms 27 with the upper terminal 2. These spaced arms carry between them the timing mechanism and the connecting switch, the movable switch blade of which is indicated at 28. This connecting switch for connecting a succeeding fuse unit in circuit after the blowing of a preceding fuse unit may be of laminated construction or brush like construction, as shown, and may be provided with an arc finger 29 if desired, such contact and arc finger engaging the upper stationary contact 30 when the switch moves to closed position. The upper contact is connected by means of a conductor 31, see Figure 5, with the upper terminal member of the succeeding fuse unit.

The switch arm is carried by a lever 32 pivoted as indicated at 33 and is urged towards switch closed position by means of the spring 34. It is restrained from moving towards switch closed position as long as the fuse tube is in its operative position. This is accomplished by providing a lever 35 which is spring pressed downwardly and which bears against the upper contact of the fuse tube. This lever is provided with links 36 hinged thereto and such links are slotted and receive pins 37 carried by the lever 32, as is apparent from Figure 1. However, when the fuse tube moves to inoperative position, the lever 35 is released and consequently releases the lever 32 and allows the movable contact 28 to move towards closed position.

The movable contact does not immediately move to closed position as it is retarded by timing mechanism which will be described. This movable contact is clamped between a projecting member 38 and the face of the lever 32, as will be seen from Figure 1. The projecting member or arm 38 carries a roller 39 which bears on the cam face 40 of a lever 41 pivoted as indicated at 42 between the side plates 27. If desired, a set screw 43 provided with a lock nut may be carried by the extension 38 and may bear against the cam member or lever 41 to vary the time of closing of the switch, as the adjustment of the set screw will determine the position of the lever 41 at the start of the closing motion of the switch and consequently will determine the initial compression of the outer metal bellows 44 of the time delay mechanism.

This time delay mechanism compresses the outer metal bellows 44 and the storage bellows 45 which are in communication through a small aperture 46. The bellows 44 and 45 are carried by a pivoting head 47 which is pivotally carried between the side plates 27, and the bellows 44 is provided with a forward head or outer head 48, which is pivoted between the arms of the lever 41 so that when the lever 41 moves upwardly, it compresses the bellows 44 and slowly discharges liquid through the orifice 46 into the storage bellows 45.

The return stroke of the bellows 44 is accomplished through the medium of the restoring spring 49 when the fuse tube is moved back to operative position, as will hereinafter appear. It is apparent from the description given that when the fuse link blows, the fuse tube rocks outwardly adjacent its lower end and moves downwardly so that the ears 16 clear the cam faces 17 and finally the fuse tube rocks to full open position, as previously described. This releases the switch 28 whose closing motion is retarded due to the action of the timing mechanism. It is to be noted, however, that the cam face 40 is so shaped that although the initial closing motion of the switch is slow, it closes with a snap motion or quick motion at the final portion of its stroke.

This closing of the switch connects the next succeeding fuse unit in place. However, it is to be noted that the time delay is such as to allow the fuse tube to fully clear itself, even under small overloads where a large or explosive pressure is not suddenly built up within the fuse tube.

When the fuse tube is rocked back into operative position, the upper contact engages the lever 35, see Figure 1, which is in the path of motion of this upper contact when the fuse is rocked back into place. This repositioning of the fuse tube, therefore, opens the switch 28 and disconnects the next succeeding fuse unit, allowing the replaced fuse to carry the load. Obviously after a fuse has blown, a visual indication is given as the fuse tube projects from the housing and also it is apparent that this blown fuse tube may be refused without interrupting the service and may thereafter be rocked back into place.

It is preferable to connect the switch arm 28 and the upper terminal member 2 by means of a flexible leader 50, as indicated in Figure 1.

In the form of the invention just described, it is to be noted that the switch is located above the fuse tube. However, it is obvious that the switch could be located to the side of the fuse tube, if so desired.

Referring now to Figures 3 and 4, it will be seen that in this form of the invention the movable switch arm 51 and its arc finger 52 is located in a compartment 53 formed in a housing 54 preferably integral with the main housing 55 but set off to the side thereof and closed by a separate and removable cover plate 56.

In this form of the invention the same manner of hinging the door 57 may be followed if desired, or, if desired, the hinge members 58 may be carried by the housing or main body portion 55 and may be located below an overhanging lip portion 60 formed integrally with the housing. The door is provided with an upper trunnion 61 which fits within the hook-shaped hinge members 58 and is removable therefrom, as previously described.

The fuse tube 62 may be exactly similar to that previously described and its upper contact 63 may engage the upper contact or brush 64 exactly as has been described in connection with Figure 1. It may rock downwardly and outwardly exactly as has heretofore been described.

Obviously the same timing mechanism could be employed if so desired, though a different form has been shown in Figures 3 and 4.

In this form of the invention it is, of course, understood that the upper stationary contact 65 is carried within the auxiliary housing 54 and is connected to the upper terminal member 66 of the next succeeding fuse, as has been heretofore explained in connection with Figure 1.

The timing mechanism is carried between the side plates 67 which are preferably joined by means of a lug 68 for a purpose hereinafter to appear. This timing mechanism includes the compression bellows 69 and the storage bellows 70 pivotally carried between the housing, as has heretofore been described, and is provided with the intermediate head 71 and the outer head 72.

This outer head is pivotally supported from the free ends of a bifurcated lever 73 pivoted as indicated at 74 and provided with an L-shaped projection 75. The projection 75 is provided with a set screw 76 which contacts with the stop or web 68 and thus determines the initial compression of the bellows 69. The construction of the compression and storage bellows is identically as that described in connection with Figure 2.

A rock shaft 77 is carried by the side plates 67 and projects into the auxiliary housing 54 and rigidly carries the movable switch arm 51. A bell crank lever is mounted rigidly on the rock shaft 77 and comprises a pair of upwardly projecting arms 78 which bear against pins 85 carried by the front head 72 of the bellows mechanism and compresses such bellows mechanism as these arms are rocked in a counterclockwise direction by means of the spring 79, as viewed in Figure 3.

This inward rocking of the levers 78 is normally prevented due to the fact that the other arm of the bell crank lever, namely that indicated by the reference character 80, is in engagement with the cap 81 of the upper contact 63 of the fuse tube as long as the fuse tube is in its operative position. If desired, the arms 80 of the bell crank lever may be provided with a transverse web 82, which is shown in Figure 4. Also this web, as well as these arms, may be provided with an extension 83 which is normally located inwardly of the cap portion 81 of the upper contact of the fuse tube.

It is preferable to connect the bell crank lever with the upper terminal 66 by means of a flexible leader 84, see Figure 1, so that when the switch 51 is closed, current is carried directly from the upper terminal member through this flexible leader, through the rock shaft 78 to the movable switch arm 51.

When the fuse blows and moves to inoperative position, the arms 78 of the bell crank lever compress the bellows 69 and cause slow initial closing motion to be imparted to the switch arm 51. However, a final quick closing motion is allowed the switch arm 51, for the arms 78 are provided with rounded upper faces 86 which slide past the pins 85 just before complete closing motion of the switch and thus allow quick closing motion thereof.

Figure 5:
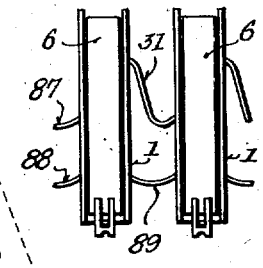
Figure 5 is a view showing a plurality of the fuse units as they are arranged for repeating drop-out fuse construction.

Referring to Figure 5, it will be seen that the line wire 87 goes to the upper terminal member of the first fuse unit and that the line wire 88 is connected to the lower terminal member of the first fuse unit and to the lower terminal members of succeeding fuse units by means of the conductor 89. Any number of units may be employed, as is obvious from an inspection of Figure 5.

The box is intended to be mounted in the vertical position so that the door will tend to remain in the closed position by gravity. Anyone skilled in the art, however, can readily see that by adding a spring member, the door can be made to close even though the box should be mounted in a position other than the vertical.

Figure 6:
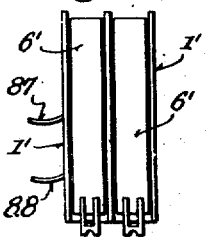
Figure 6 is a view showing a further form of the invention and corresponding to Figure 5.

It is obvious that the several fuse units may be placed in separate casings, as previously described, or may be placed in a single casing without departing from the spirit of the invention and as shown in Figure 6. This construction would be identically like that hereinbefore described with the exception that a single body portion or casing 1' houses all of the units, separate doors 6' being provided and the units otherwise corresponding identically to those previously described. While the successive fuse units have been shown as of duplicate construction, it is, of course, obvious that this is not necessary. It is apparent that they could be of different types. The first fuse unit could be closed, for instance, and the second one opened, or vice versa, or, in fact, any other combination without departing from the spirit of this invention.

If desired, a contact finger may be provided in accordance with that disclosed in our copending application for Drop-out fuses, Serial No. 7,862 filed February 23, 1935, now Patent #2,029,593, granted Feb. 4, 1936. This construction is shown in Figure 7 in which the door is indicated at 90 and the fuse tube at 91. The lever 21' corresponds to the lever 21 previously described, namely, that normally engaged by the lower brush, as shown in Figure 1. However, the lever 21′ is provided with a contact finger 92 which is positioned within a slot in the lever and is pivotally carried by the contact lever 21 upon the pintle pin 93. The contact finger or contact lever 92 is urged outwardly by means of a spring 94.

Although this invention has been described in considerable detail, it is to be understood that such description is intended as illustrative rather than limiting, as the invention may be variously embodied and is to be interpreted as claimed.

We claim:

1. A repeating fuse construction comprising a first fuse unit and a second fuse unit, casing means for said fuse units, each fuse unit having stationary contacts, a fuse tube having spaced contacts and having a fuse link electrically joining said spaced contacts, latch means adjacent one end of said fuse tube, and hinge supporting means adjacent the other end of said fuse tube for normally holding said fuse tube with its spaced contacts in engagement with said stationary contacts, said hinge means being restrained against releasing motion by said fuse link, doors for said casing means, an electric line normally connected through said first fuse unit, and switch means controlled by the position of the fuse tube of said first fuse unit for connecting the electric line through said second fuse unit when said first fuse unit has blown, the door for said first casing means being supported independently of said first fuse tube, said door being movable outwardly by the outward motion of said first fuse tube when said first fuse unit has blown.

2. A repeating fuse construction comprising a first fuse unit and a second fuse unit, casing means for said fuse units, each fuse unit having stationary contacts, a fuse tube having spaced contacts and having a fuse link electrically joining said spaced contacts, latch means adjacent one end of said fuse tube, and hinge supporting means adjacent the other end of said fuse tube for normally holding said fuse tube with its spaced contacts in engagement with said stationary contacts, said hinge means being restrained against releasing motion by said fuse tube, doors for said casing means, an electric line normally connected through said first fuse unit, and switch means controlled by the position of the fuse tube of said first fuse unit for connecting the electric line through said second fuse unit when said first fuse unit has blown, the fuse tube of each fuse unit rocking downwardly to inoperative position automatically after the fuse has blown, the fuse tube of each fuse unit having sliding motion with respect to the corresponding door, the door for said first casing means being supported independently of said first fuse tube, said door being movable outwardly by the outward motion of said first fuse tube when said first fuse unit has blown.

3. A repeating fuse construction comprising a first fuse unit and a second fuse unit, casing means for said fuse units, each fuse unit having stationary contacts, a fuse tube having spaced contacts and having a fuse link electrically joining said spaced contacts, latch means adjacent one end of said fuse tube, and hinge supporting means adjacent the other end of said fuse tube for normally holding said fuse tube with its spaced contacts in engagement with said stationary contacts, said hinge means being restrained against releasing motion by said fuse tube, doors for said casing means, an electric line normally connected through said first fuse unit, and switch means controlled by the position of the fuse tube of said first fuse unit for connecting the electric line through said second fuse unit when said first fuse unit has blown, the fuse tube of each fuse unit rocking downwardly to inoperative position automatically after the fuse has blown, the fuse tube of said first fuse unit having sliding motion with respect to the corresponding door, the door of said first fuse unit being pivotally supported from said housing independently of the supporting means of said first fuse tube and arranged in the path of travel of said first fuse tube, the door of said first fuse unit independently of its fuse tube moving towards closed position after the fuse tube has moved to inoperative position.

4. A repeating fuse construction comprising a first fuse unit and a second fuse unit, casing means for said fuse units, each fuse unit having stationary contacts, a fuse tube having spaced contacts and having a fuse link electrically joining said spaced contacts, detachable supporting means for holding the fuse tube in operative position with the spaced contacts in engagement with the stationary contacts, said means being restrained against releasing motion by the fuse link, doors for said casing means, an electric line normally connected through the said first fuse unit, and automatic switch means for connecting the electric line through the second fuse unit upon blowing of the first fuse unit, the fuse tube of said first fuse unit controlling said switch, the door for said first casing means being supported independently of said first fuse tube, said door being movable outwardly by the outward motion of said first fuse tube when said first fuse unit has blown.

5. A repeating fuse construction comprising a first fuse unit and a second fuse unit, casing means for said fuse units, each fuse unit having stationary contacts, a fuse tube having spaced contacts and having a fuse link electrically joining said spaced contacts, detachable supporting means for holding the fuse tube in operative position with the spaced contacts in engagement with the stationary contacts, said means being restrained against releasing motion by the fuse link, doors for said casing means, an electric line normally connected through the said first fuse unit, and automatic switch means for connecting the electric line through the second fuse unit upon blowing of the first fuse unit, the fuse tube of said first fuse unit controlling said switch, said switch being housed within said casing means, the door for said first casing means being supported independently of said first fuse tube, said door being movable outwardly by the outward motion of said first fuse tube when said first fuse unit has blown.

6. A repeating fuse construction comprising a first fuse unit and a second fuse unit, casing means for said fuse units, each fuse unit having stationary contacts, a fuse tube having spaced contacts and having a fuse link electrically joining said spaced contacts, detachable supporting means for holding the fuse tube in operative position with the spaced contacts in engagement with the stationary contacts, said means being restrained against releasing motion by the fuse link, doors for said casing means supported independently of the fuse tubes, an electric line normally connected through the said first fuse unit, and automatic switch means for connecting the electric line through the second fuse unit upon blowing of the first fuse unit, the fuse tube of said first fuse unit controlling said switch, said switch being housed within said casing means, the door of each fuse unit automatically moving outwardly when the fuse tube of such fuse unit drops to inoperative position and automatically moving inwardly after the fuse tube has moved to its final inoperative position.

7. A repeating fuse construction comprising a first fuse unit and a second fuse unit, casing means for said fuse units, each fuse unit having stationary contacts, a fuse tube having spaced contacts and having a fuse link electrically joining said spaced contacts, means including pivoted lever mechanism for holding the fuse tube in operative position with the spaced contacts in engagement with the stationary contacts, said lever being pivotally supported adjacent its lower end from said casing means and pivotally supporting the fuse tube adjacent the upper end of said lever, said lever being normally restrained against releasing motion by said fuse link, doors for said casing means hingedly supported independently of said levers, the door of said first fuse unit being arranged in the path of travel of the fuse tube of said first fuse unit and being movable outwardly by the outward motion of said first fuse tube, an electric line normally connected through said first fuse unit, and automatic switch means biased towards closed position and controlled by the fuse tube of said first fuse unit for connecting the electric line through the second fuse unit upon blowing of the first fuse unit, said switch means including reset means positioned in the path of movement of the fuse tube when said switch means is in closed position, whereby when the fuse tube is refused and rocked to operative position the switch means is opened.

8. A repeating fuse construction comprising a first fuse unit and a second fuse unit, casing means for said fuse units, each fuse unit having stationary contacts, a fuse tube having spaced contacts and having a fuse link electrically joining said spaced contacts, means including pivoted lever mechanism for holding the fuse tube in operative position with the spaced contacts in engagement with the stationary contacts, said lever being pivotally supported adjacent its lower end from said casing means and pivotally supporting the fuse tube adjacent the upper end of said lever, said lever being normally restrained against releasing motion by said fuse link, doors for said casing means hingedly supported independently of said levers, the door of said first fuse unit being arranged in the path of travel of the fuse tube of said first fuse unit and being movable outwardly by the outward motion of said first fuse tube, an electric line normally connected through said first fuse unit, and automatic switch means biased towards closed position and controlled by the fuse tube of said first fuse unit for connecting the electric line through the second fuse unit upon blowing of the first fuse unit, said switch means including reset means positioned in the path of movement of the fuse tube when said switch means is in closed position, whereby when the fuse tube is refused and rocked to operative position the switch means is opened, said switch means being housed in the same compartment with the fuse tube of said first fuse unit.

9. A repeating fuse construction comprising a first fuse unit and a second fuse unit, casing means for said fuse units, each fuse unit having stationary contacts, a fuse tube having spaced contacts and having a fuse link electrically joining said spaced contacts, means including pivoted lever mechanism for holding the fuse tube in operative position with the spaced contacts in engagement with the stationary contacts, said lever being pivotally supported adjacent its lower end from said casing and pivotally supporting the fuse tube adjacent the upper end of said lever, said lever being normally restrained against releasing motion by said fuse link, doors for said casing means hingedly supported independently of said levers, the door of said first fuse unit being arranged in the path of travel of the fuse tube of said first fuse unit and being movable outwardly by the outward motion of said first fuse tube, an electric line normally connected through said first fuse unit, and automatic switch means biased towards closed position and controlled by the fuse tube of said first fuse unit for connecting the electric line through the second fuse unit upon blowing of the first fuse unit, said switch means including reset means positioned in the path of movement of the fuse tube when said switch means is in closed position, whereby when the fuse tube is refused and rocked to operative position the switch means is opened, said switch means being housed within a separate compartment from that housing the fuse tube of said first fuse unit.

10. A repeating fuse construction comprising a first fuse unit and a second fuse unit, casing means for said fuse units, each fuse unit having stationary contacts, a movably supported fuse tube having a fuse link electrically joining said contacts, means restrained by the fuse link for holding the fuse tube in operative position, the fuse tube of at least said first fuse unit being movable outwardly upon blowing of said first fuse unit, doors for said casing means hingedly supported independently of said first mentioned means, the door of said first fuse unit being arranged in the path of travel of the fuse tube of said first fuse unit and being movable outwardly by the outward motion of said first fuse tube, an electric line normally connected through said first fuse unit, and automatic switch means biased towards closed position and controlled by the fuse tube of said first fuse unit for connecting the electric line through the second fuse unit upon blowing of the first fuse unit, said switch means including reset means positioned in the path of movement of the fuse tube when said switch means is in closed position, whereby when the fuse tube is refused and rocked to operative position the switch means is opened, said casing means having a separate compartment for housing said switch means.

11. A repeating fuse construction comprising a first fuse unit and a second fuse unit, casing means for said fuse units, each fuse unit having stationary contacts, a movably supported fuse tube having a fuse link electrically joining said contacts, means restrained by the fuse link for holding the fuse tube in operative position, the fuse tube of at least said first fuse unit being movable outwardly upon blowing of said first fuse unit, doors for said casing means hingedly supported independently of said first mentioned means, the door of said first fuse unit being arranged in the path of travel of the fuse tube of said first fuse unit and being movable outwardly by the outward motion of said first fuse tube, an electric line normally connected through said first fuse unit, automatic switch means biased towards closed position and controlled by the fuse tube of said first fuse unit for connecting the electric line through the second fuse unit upon blowing of the first fuse unit, said switch means including reset means positioned in the path of movement of the fuse tube when said switch means is in closed position, whereby when the fuse tube is refused and rocked to operative position the switch means is opened, said casing means having a separate compartment for said switch means, and a separate cover for the compartment housing said switch means.

12. A repeating fuse construction comprising a first fuse unit and a second fuse unit, casing means for said fuse units, each fuse unit having stationary contacts, a movably supported fuse tube having a fuse link electrically joining said contacts, means carried by said casing and restrained by said fuse link for holding the fuse tube in operative position, an electric line normally connected through said first fuse unit, automatic switch means biased towards closed position and controlled by the fuse tube of said first fuse unit for connecting the electric line through the second fuse unit upon blowing of the first fuse unit, said switch means including reset means positioned in the path of movement of the fuse tube when said switch means is in closed position, whereby when the fuse tube is refused and rocked to operative position the switch means is opened, said switch means being housed in the same compartment with the fuse tube of said first fuse unit, and time delay mechanism for delaying the closing motion of said switch means.

13. A repeating fuse construction comprising a first fuse unit and a second fuse unit, casing means for said fuse units, each fuse unit having stationary contacts, a movably supported fuse tube having a fuse link electrically joining said contacts, supporting means restrained by said fuse link for holding the fuse tube in operative position, an electric line normally connected through said first fuse unit, and automatic switch means biased towards closed position and controlled by the fuse tube of said first fuse unit for connecting the electric line through the second fuse unit upon blowing of the first fuse unit, said switch means including reset means positioned in the path of movement of the fuse tube when said switch means is in closed position, whereby when the fuse tube is refused and rocked to operative position the switch means is opened, said switch means being housed within a separate compartment from that housing the fuse tube of said first fuse unit, and time delay mechanism for delaying the closing motion of said switch means.

14. A repeating fuse construction comprising a first fuse unit and a second fuse unit, casing means for said fuse units, each fuse unit having stationary contacts, a movably supported fuse tube having a fuse link electrically joining said contacts, supporting means restrained by said fuse link for holding the fuse tube in operative position, an electric line normally connected through said first fuse unit, automatic switch means biased towards closed position and controlled by the fuse tube of said first fuse unit for connecting the electric line through the second fuse unit upon blowing of the first fuse unit, said switch means including reset means positioned in the path of movement of the fuse tube when said switch means is in closed position, whereby when the fuse tube is refused and rocked to operative position the switch means is opened, said casing means having a separate compartment for said switch means, and time delay mechanism for delaying the closing motion of said switch, said time delay mechanism being housed within the housing enclosing the fuse tube of said first fuse unit.

15. A repeating fuse construction comprising a first fuse unit and a second fuse unit, said first fuse unit having stationary contacts, said first fuse unit having a fuse tube provided with spaced contacts and having a fuse link electrically joining said spaced contacts, latch means adjacent one end of said first fuse tube and hinged supporting means adjacent the other end of said first fuse tube for normally holding said first fuse tube with its spaced contacts in engagement with said stationary contacts, said hinge means being restrained against releasing motion by said fuse link, a casing for said first fuse unit provided with a door, said door being supported by said first fuse unit and movable outwardly by the outward motion of the fuse tube of said first fuse unit, an electric line normally connected through said first fuse unit, and switch means controlled by the position of the fuse tube of said first fuse unit for connecting the electric line through said second fuse unit when said first fuse unit has blown.

16. A repeating fuse construction comprising a first fuse unit and a second fuse unit, said first fuse unit having stationary contacts, said first fuse unit having a fuse tube provided with spaced contacts and having a fuse link electrically joining said spaced contacts, latch means adjacent one end of said first fuse tube and hinged supporting means adjacent the other end of said first fuse tube for normally holding said first fuse tube with its spaced contacts in engagement with said stationary contacts, said hinge means being restrained against releasing motion by said fuse link, a casing for said first fuse unit provided with a door, said door being supported by said first fuse unit and movable outwardly by the outward motion of the fuse tube of said first fuse unit, an electric line normally connected through said first fuse unit, and switch means controlled by the position of the fuse tube of said first fuse unit for connecting the electric line through said second fuse unit when said first fuse unit has blown, the fuse tube of said first fuse unit rocking downwardly to inoperative position automatically after the first fuse unit has blown.

17. A repeating fuse construction comprising a first fuse unit and a second fuse unit, said first fuse unit having stationary contacts, said first fuse unit having a fuse tube provided with spaced contacts and having a fuse link electrically joining said spaced contacts, latch means adjacent one end of said first fuse tube and hinged supporting means adjacent the other end of said first fuse tube for normally holding said first fuse tube with its spaced contacts in engagement with said stationary contacts, said hinge means being restrained against releasing motion by said fuse link, a casing for said first fuse unit provided with a door, said door being supported by said first fuse unit and movable outwardly by the outward motion of the fuse tube of said first fuse unit, an electric line normally connected through said first fuse unit, and switch means controlled by the position of the fuse tube of said first fuse unit for connecting the electric line through said second fuse unit when said first fuse unit has blown, the fuse tube of said first fuse unit rocking downwardly to inoperative position automatically after the first fuse unit has blown, the fuse tube of said first fuse unit having sliding motion with respect to the door.

18. A repeating fuse construction comprising a first fuse tube assembly and a second fuse tube assembly, casing means for said fuse tube assemblies, said first fuse tube assembly including supporting means and a fuse tube carried by said supporting means and movable with respect to said supporting means, said first fuse tube assembly having spaced contacts and having stationary contacts normally engaged by said spaced contacts, said first fuse tube assembly being movable outwardly from operative to inoperative position, a fuse link carried by said first fuse tube assembly electrically connecting said spaced contacts and normally restraining said first fuse tube assembly from moving from operative to inoperative position, and a door for said first fuse tube assembly, said door being movable outwardly by the outward motion of said first fuse tube assembly when said first fuse tube assembly has blown.

19. A repeating electrical cut-out construction comprising a first cut-out unit and a second cut-out unit, casing means for at least said first cut-out unit, said casing means having stationary contacts, an arc tube having spaced contacts normally electrically connected to said spaced contacts, an expulsible conductor carried by said arc tube and normally connecting said spaced contacts, and means mechanically holding said arc tube in operative position, said arc tube being movable from operative to inoperative position away from said stationary contacts, current controlled means for releasing said last mentioned means upon the occurrence of an electrical overload, said casing means for said first cut-out unit being provided with a door, said door being arranged in the path of travel of said arc tube when said arc tube moves from operative to inoperative position, said door automatically closing after said arc tube has moved to inoperative position, an electric line normally connected through said first cut-out unit, and switch means for connecting said electric line through said second cut-out unit when said arc tube moves to inoperative position.

20. A cut-out comprising a casing having spaced contacts, a fuse tube located within said casing and having contacts normally engaging said spaced contacts, a fuse link carried by said fuse tube and normally electrically joining the contacts of said fuse tube, said cut-out having a third contact normally insulated from said first mentioned spaced contacts, a lever normally supporting said fuse tube in operative position and being restrained against releasing motion by said fuse link, whereby when said fuse link blows, said fuse tube will move away from said spaced contacts, and switch means movable to closed position when said fuse blows and establishing electrical connection between one of said spaced contacts and said third contact.

21. A cut-out comprising a casing having spaced contacts, a fuse tube located within said casing and having contacts normally engaging said spaced contacts, a fuse link carried by said fuse tube and normally electrically joining the contacts of said fuse tube, said cut-out having a third contact normally insulated from said first mentioned spaced contacts, a lever normally supporting said fuse tube in operative position and being restrained against releasing motion by said fuse link, whereby when said fuse link blows, said fuse tube will move away from said spaced contacts, and switch means biased towards closed position and normally restrained by said fuse tube and movable to closed position when said fuse blows and establishing electrical connection between one of said spaced contacts and said third contact.

22. A cut-out comprising a casing having spaced contacts, a fuse tube located within said casing and having contacts normally engaging said spaced contacts, a fuse link carried by said fuse tube and normally electrically joining the contacts of said fuse tube, said cut-out having a third contact normally insulated from said first mentioned spaced contacts, a lever normally supporting said fuse tube in operative position and being restrained against releasing motion by said fuse link, whereby when said fuse link blows, said fuse tube will move away from said spaced contacts, switch means biased towards closed position and normally restrained by said fuse tube and movable to closed position when said fuse blows and establishing electrical connection between one of said spaced contacts and said third contact, and time delay mechanism for delaying the closing motion of said switch means.

WILLIAM O. SCHULTZ.
ALWIN G. STEINMAYER.